Sept. 13, 1966 G. E. THERIAULT 3,272,915

COLOR TELEVISION RECEIVER INCLUDING TRANSISTORIZED COLOR KILLER

Filed April 2, 1962 2 Sheets-Sheet 1

INVENTOR.
GERALD E. THERIAULT
BY
W. H. Sprangle
ATTORNEY

COLOR TELEVISION RECEIVER INCLUDING TRANSISTORIZED COLOR KILLER

Filed April 2, 1962 2 Sheets-Sheet 2

INVENTOR.
GERALD E. THERIAULT
BY [signature]
ATTORNEY

United States Patent Office 3,272,915

Patented Sept. 13, 1966

3,272,915

COLOR TELEVISION RECEIVER INCLUDING TRANSISTORIZED COLOR KILLER

Gerald E. Theriault, Hopewell, N.J., assignor to Radio Corporation of America, a corporation of Delaware Filed Apr. 2, 1962, Ser. No. 184,157

10 Claims. (Cl. 178—5.4)

This invention relates to television receivers adapted to receive both color, and black and white signals, and particularly to apparatus for automatically adapting the receiver for either black and white or color image reproduction and to automatically control during color image reproduction the color signal processing apparatus so as to maintain good subjective color quality of the reproduced images.

The color television system presently standardized in the United States employs a composite video signal including a luminance component and a chrominance component. The luminance component is of the same general type as that used in black and white television systems and has a frequency band extending from a relatively low frequency to about 4 mc. per second. The chrominance component is a subcarrier wave which is modulated in phase to represent hue, and in amplitude to represent color intensity. The chrominance component, consisting of the subcarrier wave and its modulation sidebands, occupies a smaller frequency band than the luminance component and this smaller band is located at the high frequency end of the luminance component frequency band.

The difference in frequencies between the luminance and chrominance components may, at a given receiving location, result in the relative amplitudes of the two composite video signal components being changed when the composite signal is transmitted over the air because frequency selective attenuations may exist in the transmission path. Such a change in relative amplitudes of the luminance and chrominance components may result in the reproduction of a color image with color and contrast values which are not optimum.

As transmitted, the composite color television signal has, in addition to the luminance and chrominance components previously mentioned, horizontal deflection synchronizing pulses and color synchronizing bursts of the color subcarrier wave. The horizontal synchronizing pulses and the subcarrier bursts are transmitted with certain specified amplitudes relative to one another. The horizontal synchronizing pulses have a repetition rate of approximately 15,750 cycles per second and the color bursts have the frequency of the color subcarrier wave which is approximately 3.58 mc. per second. Thus, the relative amplitudes of horizontal synchronizing pulses and the color synchronizing bursts in the received signal indicate the nature and general extent of any frequency selective effects in the transmission path upon the chrominance component as compared to the luminance component. These relative amplitudes also indicate any variations between the luminance and chrominance components which may occur between different television transmitting stations. Furthermore, the presence of the color synchronizing bursts in the received composite color television signal is an indication that the signal represents a color subject and the absence of these bursts indicates that the subject is a black and white one.

It is an object of the present invention to control automatically the luminance and chrominance components of a received composite color television signal in a novel manner in response to a detected difference in amplitude between the received color synchronizing bursts and the horizontal synchronizing pulses so as to maintain good subjective color quality of the reproduced image.

It is another of the invention to control a television receiver in a novel manner so as to adapt it automatically for response either to a black and white television signal or to a color television signal.

The present invention utilizes transistor signal processing apparatus including at least two amplifiers for the chrominance component of the received color television signal, a color synchronizing burst detector and a color killer functioning to adapt the receiver for operation in response either to black and white or color signals. The color killer transistor is biased by current flowing in the first transistor chrominance component amplifier so that the color killer current is maximum in the absence of a chrominance component and is minimum when a chrominance component is present. The color killer is coupled to the second chrominance component amplifier so that, when the color killer current is maximum is response to the presence of a chrominance component, the second chrominance amplifier is rendered inoperative and, when the color killer current is minimum in response to the presence of a chrominance component, the second amplifier is rendered operative for further amplification of the chrominance component.

The amplitude of the color synchronizing bursts is detected to produce a control signal which is applied as an inverse gain controlling bias to the first transistor chrominance component amplifier so as to maintain substantially constant level of the chrominance component as processed by the two transistor amplifiers.

For a better understanding of the invention, reference may be had to the following description given in connection with the accompanying drawings, of which:

Figure 1:
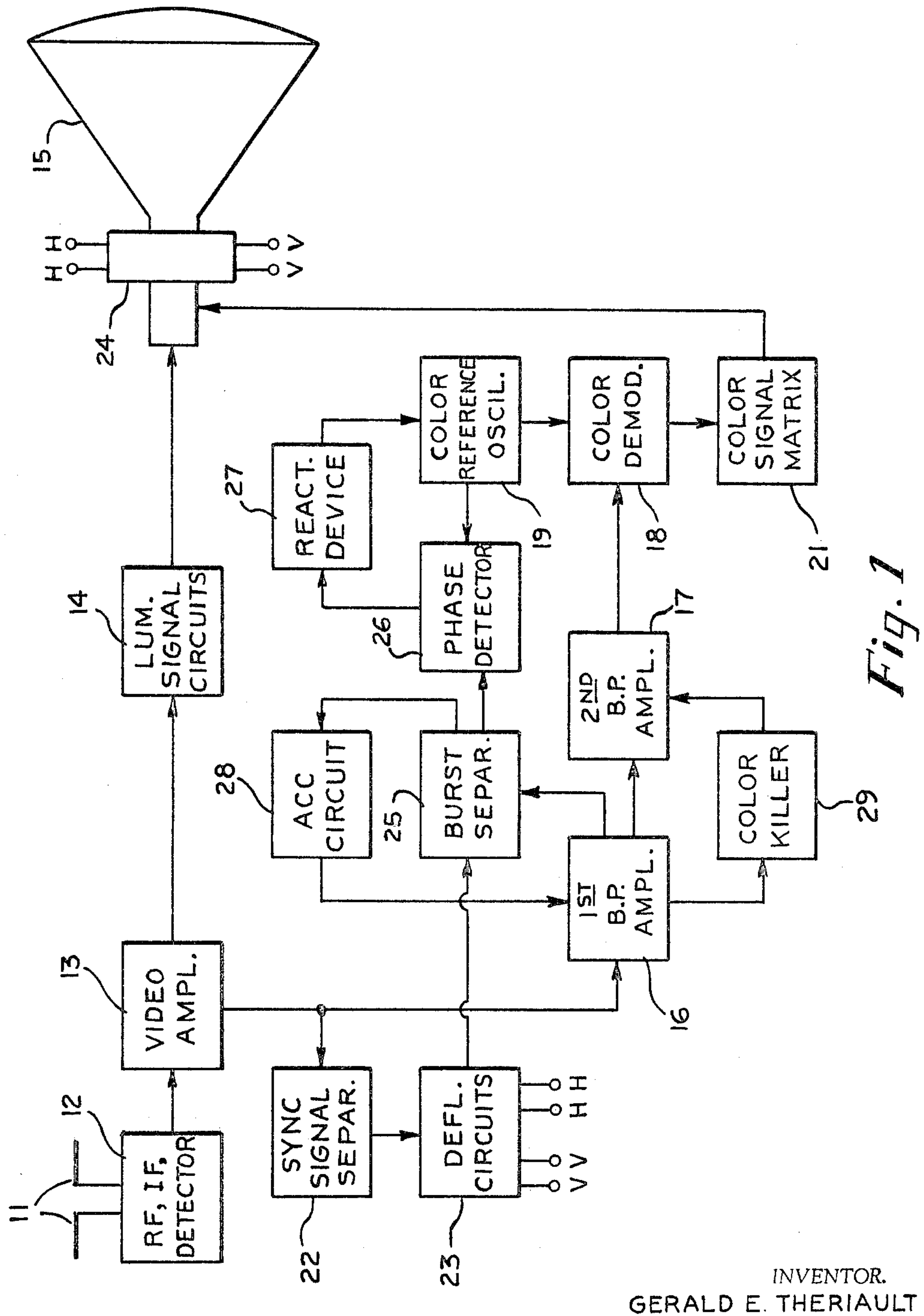
FIGURE 1 is a block diagram of a color television receiver which may be employed to reproduce either a color image or a black and white image, and in which the present invention is embodied.

Reference first is made to FIGURE 1. The composite color television signal received by an antenna 11 is processed in the RF, IF, detector 12 to produce a composite video signal comprising luminance and chrominance components, deflection synchronizing pulses and color synchronizing bursts. In the case of a black and white transmission, the composite video signal will not include a chrominance component and the color bursts. The composite video signal is amplified in a video amplifier 13 which may consist of one or more stages. It is to be understood that the level of the composite signal is maintained substantially constant by means of any known automatic gain control (AGC) of the RF and IF amplifiers.

The luminance component is impressed upon the luminance component circuits 14 for further processing (which may include additional amplification) so that there is produced at its output three separate luminance signals which may have different amplitudes. These luminance signals are impressed respectively upon corresponding electron beam intensity controlling electrodes (such as the cathodes) of the red, green and blue electron guns of a tricolor kinescope 15. Details of these circuits are not shown because they may be the same as known circuits for performing a similar function and their detailed description is not needed for an understanding of the invention. The kinescope 15 may be a shadow mask type such as the 21CYP22A, the 21FBP22 or the 21FJP22 all of which are presently used in color television receivers.

The chrominance componant and the color bursts of the composite video signal derived from the video amplifier 13 are separated from the rest of the composite signal by a first bandpass amplifier 16, The output of the first bandpass amplifier is coupled to the input of a second bandpass amplifier 17. Both of these amplifiers are designed so as to amplify substantially only those signals in the frequency range of the color subcarrier wave and its modulation sidebands. The output of the second bandpass amplifier is coupled to a color demodulator 18 which also receives suitable phases of a demodulating color reference wave from a color reference oscillator 19. The color representative signals derived from the color demodulator 18 are suitably combined in a color signal matrix 21 to produce red, green and blue color difference signals which are impressed upon other beam intensity control electrodes (such as the control grids) of the red, green and blue electron guns of the tricolor kinescope 15.

By means of the luminance signals impressed upon the cathodes of the electron guns and the color difference signals impressed upon the control grids of these guns, the electron beams of the color kinescope 15 are modulated suitably to represent the red, green and blue color components of the image to be reproduced. Such circuits are known in the operation of color television receivers and hence the details are not shown because they are not necessary to an understanding of the present invention.

The deflection synchronizing pulses of the received composite video signal are employed to control deflection of the electron beams of the color kinescope 15 in a conventional manner. This is accomplished by means of a deflection sync signal separator 22 having its input coupled to the output of the video amplifier 13 and its output coupled to the deflection circuits 23. The usual deflection waves produced by the deflection circuits 23 are used to energize the deflection yoke 24 by the indicated interconnections.

The output circuit of the first bandpass amplifier 16 is coupled to a burst separator 25 which functions, under the control of keying pulses derived from the deflection circuits 23, to separate the color synchronizing bursts from the chrominance componant of the composite signal. The separated bursts are impressed upon a phase detector 26 together with the color reference wave derived from the color reference oscillator 19. Any deviation in phase of the color reference wave from the bursts is detected and used to bring the color reference wave oscillations into proper phase by means of a reactance device 27 coupled between the phase detector 26 and the frequency and phase controlling circuits of the color reference oscillator 19.

The receiver also includes an automatic color control (ACC) circuit 28 which is coupled to the output of the burst separator 25 so as to receive therefrom color synchronizing bursts which are rectified and amplified if necessary to produce a control signal representative of the amplitude of the bursts. Such a control signal derived from the ACC circuit 28 is impressed upon the first bandpass chrominance component amplifier 16 at a suitable point to vary its gain inversely to detected amplitude changes of the color synchronizing bursts.

The television receiver embodying this invention also includes a color killer 29 which is coupled between the first bandpass amplifier 16 and the second bandpass amplifier 17. This coupling is such that the presence or absence of a chrominance component in the received composite signal at the first bandpass amplifier 16 controls the color killer 29 so as to enable it to control the operativeness of the second bandpass amplifier 17. When a chrominance component is present at the first bandpass amplifier 16 the second bandpass amplifier 17 is rendered operative to provide an amplified chrominance component to the color demodulator 18. When no chrominance component is present at the first bandpass amplifier the second bandpass amplifier is rendered inoperative so that no chrominance component is impressed upon the color demodulator. Hence, no color difference signals are available from the color signal matrix 21 for impression upon the control grids of the color kinescope 15 and the kinescope functions only in response to the luminance signal derived from the luminance signal circuits 14 to reproduce a black and white picture.

The particular apparatus to which the present invention relates includes the first and second bandpass amplifiers 16 and 17, the burst separator 25, the ACC circuit 28 and the color killer 29. These circuits are transistorized, as also may be the other circuits of the receiver. For a detailed description of the circuits embodying the invention, reference now is made to FIGURE 2. The first bandpass amplifier 16 includes a transistor 31 connected for a common emitter operation. The base electrode of the transistor is coupled by means of a capacitor 32 to the output circuit of the video amplifier 13 so as to receive the composite video signal. The circuits of the amplifier 16 are designed so that there is produced in its output an amplified version of substantially only the color subcarrier wave and its modulation sidebands. Such an amplified signal is derived from an output transformer 33 having its primary 34 connected to the collector electrode of the transistor 31 and its secondary 35 connected to an output potentiometer 36. The emitter electrode of the transistor 31 is connected to ground through a diode 37 (the functions of which will be later described) and a resistive-capacitive network 38. Suitable operating bias for application to the base electrode of the transistor 31 is obtained from a voltage divider including resistors 39, 41 and 42 connected in series between a source of negative biasing voltage —B and ground.

One output from the first bandpass amplifier 16 is taken from the movable contact of the potentiometer 36 which is coupled by means including a capacitor 43 to the base electrode of a transistor 44 included in the second bandpass amplifier 17. This transistor also is connected for common emitter operation. A still further amplified version of the chrominance component of the composite video signal is produced in the output circuit of the amplifier 17 which includes an output transformer 45 having its primary 46 connected to the collector electrode of the transistor 44 and a secondary 47 connected to an output potentiometer 48. The emitter electrode of the transistor 44 is connected to ground through a resistive-capacitive network 49 and a suitable operating bias is applied to the base electrode by a voltage divider including resistors 51 and 52 connected between a negative source of biasing voltage —B and ground. The amplified chrominance component by the amplifier 17 is taken from the movable contact of the potentiometer 48 and impressed upon the color demodulator 18 as indicated.

The amplified chrominance component of the composite video signal produced by the first bandpass amplifier 16 is impressed upon a transistor 53 of the burst separator 25 by means including a coupling capacitor 54 connected between the output potentiometer 36 of the amplifier 16 and the base electrode of the burst separator transistor 23. This transistor also is connected for common emitter operation. Also impressed upon the base electrode of this transistor are flyback pulses derived from the deflection circuits during retrace intervals of the electron beams of the color kinescope 15 of FIGURE 1. The transistor 53 thus is rendered operative only during those intervals when the color synchronizing bursts occur in the composite video signal so as to produce only bursts in the transistor 53 output circuit. The output circuit includes a transformer 55 having a primary 56 connected to the collector electrode of the transistor, a secondary 57 across which is connected an output resistor 58 and a tertiary 59 which is coupled as indicated to the phase detector 26. The emitter electrode of the burst separator transistor 23 is connected to ground through a resistive-capacitive network 61.

The separated color synchronizing bursts developed across the output resistor 58 of the burst separator 25 are impressed upon a rectifier diode 62 of the ACC circuit 28. The rectified bursts are filtered by a resistive-capacitive network 63 and impressed upon the base electrode of a D.C. amplifier transistor 64 connected for common emitter operation. The direct current control signal produced in the collector electrode circuit of the amplifier transistor 64 varies in amplitude in correspondence with any amplitude variations of the received color synchronizing bursts. Since the level of the composite video signal is maintained substantially constant at the video amplifier 13 of FIGURE 1 by the receiver's AGC system, any amplitude variation of the color bursts is an indication of a variation in the proper relative amplitudes of the luminance and chrominance components. If no bursts are present, such as when a black and white video signal is being received, no control signal is developed.

Any control signal derived from the ACC circuit 28 is impressed upon the base electrode circuit of the first bandpass amplifier transistor 31 by a connection to the biasing voltage divider at the junction point of resistors 39 and 41. Such a control signal functions (in a manner to be more fully described later) to automatically control the gain of the amplifier 16 so as to maintain a suitable amplification of the chrominance component, whereby to maintain good subjective color quality of the reproduced image.

The color killer 29 includes a transistor 65, connected for common emitter operation, the base electrode of which is coupled through a resistor 66 to the resistive-capacitive network 38 of the first bandpass amplifier 16 so that it is biased according to the current flowing in the circuits of the first bandpass amplifier transistor 31. The emitter electrode of the color killer transistor 65 is connected to the resistive-capacitive network 49 of the second bandpass amplifier 17 in common with the emitter electrode of the transistor 44. By reason of this latter connection, the color killer 29 functions in response to information derived from the first bandpass amplifier 16 to render the second bandpass amplifier 17 operative to amplify the chrominance component when this component is present in the received composite signal and to render the amplifier 17 inoperative when no chrominance component is present, such as when a black and white television signal is being received.

Figures 2, 3:
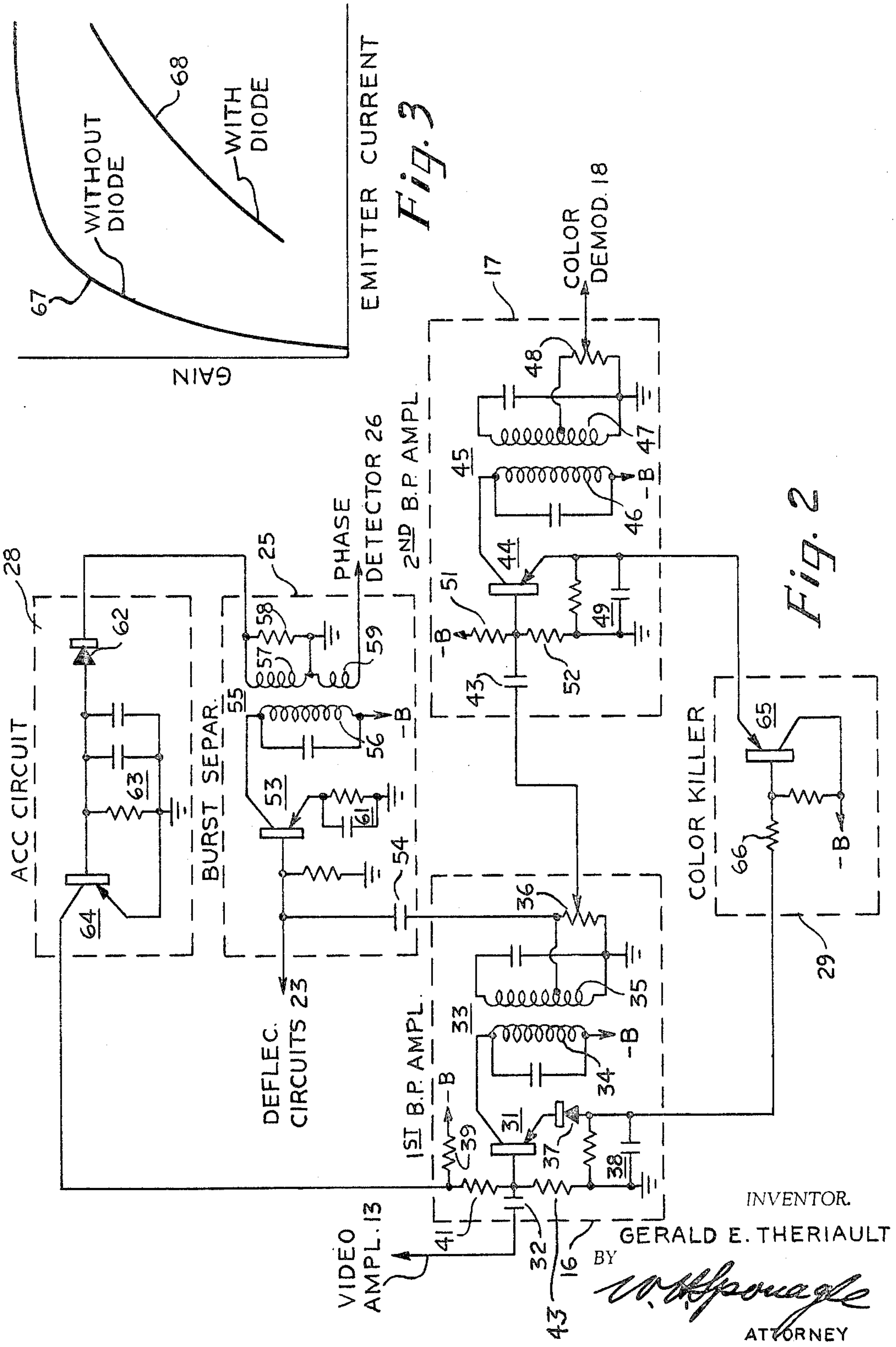
FIGURE 2 is a schematic circuit diagram of a part color television receiver of FIGURE 1 illustrating the details of the transistor color signal processing circuits embodying the invention.
FIGURE 3 is a graph illustrating the operation of the first chrominance component amplifier.

In describing the operation of the circuits of FIGURE 2, consider first that a black and white television signal is being received. Such a signal is impressed upon the base electrode input circuit of the transistor 31 of the first bandpass amplifier 16. Since this amplifier responds substantially only to signals in the frequency range of the color subcarrier wave and its modulation sidebands and, there being no such component present in the black and white signal being received, there is no signal response by this amplifier. The biasing of the transistor 31 is such that, under this condition, maximum direct current flows through the transistor and the RC network 38. The voltage thus produced across this network biases the color killer transistor 65 for maximum current conduction. This current, in traversing the RC network 49 of the second bandpass amplifier 17 biases the emitter electrode of the transistor 44 so as to render the amplifier 17 inoperative for signal amplification.

There being no signal output including color synchronizing bursts produced in the circuits of the first bandpass amplifier 16 including the output potentiometer 36, there are no bursts produced in the output of the burst separator 25. Consequently, there is no output from the burst rectifier diode 62 of the ACC circuit 28 and accordingly no control signal developed in the collector electrode circuit of the amplifier transistor 64. The first bandpass amplifier 16, therefore, remains in the described condition.

When a color television signal is received, there is amplification of the chrominance component effected by the first bandpass amplifier 16. The color synchronizing bursts included in the chrominance component are separated by the burst separator 25, rectified and amplified by the ACC circuit 28 to develop a control signal in the collector electrode circuit of the transistor 64. The application of this control signal to the base electrode to the first bandpass amplifier transistor 31 functions to change the biasing of this transistor so that the current through the RC network 38 is decreased. The voltage across the network 38 produced by such decreased current alters the biasing of the base electrode of the color killer transistor 65 so that the current drawn by it through the RC network 49 of the second bandpass amplifier 17 is reduced to a minimum. The resultant voltage developed across the RC network 49, when applied to the emitter electrode of the transistor 44, renders this amplifier operative for further amplification of the chrominance component derived from the output potentiometer 36 of the first bandpass amplifier 16.

The magnitude of the control signal derived from the ACC circuit 28 varies in correspondence with any variations in amplitude of the color synchronizing bursts. An increase in burst amplitude produces a greater magnitude of control signal which, when applied to the base electrode biasing circuit of the first bandpass amplifier 16, functions to lower the gain of this amplifier suitably to maintain a substantially constant level of amplified chrominance signal at the output potentiometer 36. Conversely, a decrease in the burst amplitude produces a control signal of decreased magnitude which increases the gain of the first bandpass amplifier 16.

The diode 37 included in the emitter electrode circuit of the first bandpass amplifier transistor 31 functions as a variable degenerative resistor with variations in current in the emitter electrode circuit. Thus, as the current is decreased in the first bandpass amplifier transistor 31, as a result of the reception of a color television signal following black and white television signal reception for example, the bias voltage applied to the base electrode of the color killer transistor 65 changes sufficiently to cause its emitter electrode current to change from maximum to minimum, thereby rendering the second bandpass amplifier 17 operative. While satisfactory operation of the apparatus has been achieved without the diode 37, it has been found that its inclusion provides additional sensitivity to the desired control of the second bandpass amplifier by the color killer.

The beneficial effects of the diode 37 may be seen from the curves of FIGURE 3. The curve 67 represents the gain of the transistor 31 for different values of emitter current when the diode is not included. The gain changes very little at high current values, but changes appreciably at low current values. The curve 68 represents the gain-versus-current characteristic of the transistor when the diode 37 is included. Substantially the same gain changes are produced by a given emitter current change at both high and low current values. The range of automatic chroma control of the first bandpass amplifier 16 by the ACC circuit 28, thus, is materially extended. Also, the input to this amplifier is linearized by the variable degenerative effect of the diode 37, thereby enabling the undistorted amplification of a signal of greater magnitude than can be amplified without some distortion in the absence of the diode.

What is claimed is:

1. In a television receiver adapted to receive both color and black and white television signals, said color signal including a chrominance video signal component in the form of a phase and amplitude modulated subcarrier wave of a given frequency and color synchronizing bursts comprising several cycles of said subcarrier wave frequency and having a fixed amplitude, the combination comprising:

a first transistor amplifier provided with input and output circuits and having said composite television signal impressed upon its input circuit and adapted to amplify and develop in its output circuit substantially only signals in the frequency range of said subcarrier wave and its modulation sidebands;

a second transistor amplifier provided with input and output circuits and having its input circuit coupled to the output circuit of said first transistor amplifier and adapted to amplify and develop in its output circuit substantially only signals in the range of said subcarrier wave and its modulation sidebands;

means coupled to said first transistor amplifier to develop a unidirectional control signal representative of the amplitude of said color synchronizing bursts;

means to impress said control signal on the input circuit of said first transistor amplifier to vary its gain inversely to the amplitude of said color synchronizing bursts;

a color killer circuit including a color killer transistor;

means responsive to current flow in said first transistor amplifier to bias said color killer transistor so that the current in said first transistor amplifier produced in the absence of said modulated subcarrier wave effects current conduction of a first magnitude in said color killer circuit and so that the current in said first transistor amplifier produced in response to a modulated subcarrier wave effects current conduction of a scond magnitude in said color killer circuit; and means responsive to current flow in said color killer circuit to bias said second transistor amplifier so that said second transistor amplifier is rendered in operative in response to said first magnitude of current conduction in said color killer circuit and is rendered operative to amplify said chrominance video signal component in response to said second magnitude of current conduction in said color killer circuit.

2. In a television receiver adapted to receive both color and black and white television signals, said color signal including a chrominance video signal component in the form of a phase and amplitude modulated subcarrier wave of a given frequency and color synchronizing bursts comprising several cycles of said subcarrier wave frequency and having a fixed amplitude, the combination comprising:

a first transistor amplifier provided with input and output circuits and having said composite television signal impressed upon its input circuit and adapted to amplify and develop in its output circuit substantially only signals in the frequency range of said subcarrier wave and its modulation sidebands;

a second transistor amplifier provided with input and output circuits and having its input circuit coupled to the output circuit of said first transistor amplifier and adapted to amplify and develop in its output circuit substantially only signals in the range of said subcarrier wave and its modulation sidebands;

means coupled to said first transistor amplifier to develop a unidirectional control signal representative of the amplitude of said color synchronizing bursts;

means to impress said control signal on the input circuit of said first transistor amplifier to vary its gain inversely to the amplitude of said color synchronizing bursts;

a color killer circuit including a color killer transistor;

means responsive to current flow in said first transistor amplifier to bias said color killer transistor so that the current in said first transistor amplifier produced in the absence of said modulated subcarrier wave produces substantial current conduction in said color killer circuit and so that the current in said first transistor amplifier produced in response to a modulated subcarrier wave produces decreased current conduction in said color killer circuit; and means responsive to current flow in said color killer circuit to bias said second transistor amplifier so that said second transistor amplifier is rendered inoperative in response to substantial current conduction in said color killer circuit and is rendered operative to amplify said chrominance video signal component in response to decreased current conduction in said color killer circuit.

3. In a television receiver adapted to receive both color and black and white television signals, said color signal including a chrominance video signal component in the form of a phase and amplitude modulated subcarrier wave of a given frequency and color synchronizing bursts comprising several cycles of said subcarrier wave frequency and having a fixed amplitude, the combination comprising:

a first transistor amplifier provided with input and output circuits and having said composite television signal impressed upon its input circuit and adapted to amplify and develop in its output circuit substantially only signals in the frequency range of said subcarrier wave and its modulation sidebands;

a second amplifier provided with input and output circuits and including a second transistor and having its input circuit coupled to the output circuit of said first transistor amplifier and adapted to amplify and develop in its output circuit substantially only signals in the range of said subcarrier wave and its modulation sidebands, said second transistor having a base electrode included in said amplifier input circuit;

means coupled to said first transistor amplifier to develop a unidirectional control signal representative of the amplitude of said color synchronizing bursts;

means to impress said control signal on the input circuit of said first transistor amplifier to vary its gain inversely to the amplitude of said color synchronizing burts;

a color killer circuit including a color killer transistor, said color killer transistor having base and emitter electrodes;

means responsive to current flow in said first transistor amplifier to bias the base electrode of said color killer transistor so that the current in said first transistor amplifier produced in the absence of said modulated subcarrier wave biases said color killer transistor for maximum current conduction and so that the current in said first transistor amplifier produced in response to a modulated subcarrier wave biases said color killer transistor for minimum current conduction; and impedance means connected in common to the emitter electrodes of said second transistor and said color killer transistor so that said second amplifier is rendered inoperative in response to maximum current conduction in said color killer transistor and is rendered operative to amplify said chrominance video signal component in response to minimum current conduction in said color killer transistor.

4. In a television receiver adapted to receive both color and black and white television signals, said color signal including a chrominance video signal component in the form of a phase and amplitude modulated subcarrier wave of a given frequency and color synchronizing bursts comprising several cycles of said subcarrier wave frequency and having a fixed amplitude, the combination comprising:

a first amplifier provided with input and output circuits and including a first transistor and having said composite television signal impressed upon its input circuit and adapted to amplify and develop in its output circuit substantially only signals in the frequency range of said subcarrier wave and its modulation sidebands, said first transistor having base and emitter electrodes included in said first amplifier input circuit;

a second amplifier provided with input and output circuits and including a second transistor and having its input circuit coupled to the output circuit of said first transistor amplifier and adapted to amplify and develop in its output circuit substantially only signals in the range of said subcarrier wave and its modulation sidebands, said second transistor having a base electrode included in said second amplifier input circuit;

means to separate said synchronizing bursts from said composite television signal;

means coupled to said burst separating means to develop a unidirectional control signal from said color synchronizing bursts;

means to impress said control signal on the base electrode of said first transistor to vary its gain inversely to the amplitude of said color synchronizing bursts;

a color killer circuit including a color killer transistor, said color killer transistor having base and emitter electrodes;

means responsive to current flow in the emitter electrode circuit of said first transistor to bias the base electrode of said color killer transistor so that the current in said first amplifier produced in the absence of said modulated subcarrier wave biases said color killer transistor for maximum current conduction and so that the current in said first amplifier produced in response to a modulated subcarrier wave biases said color killer transistor for minimum current conduction; and impedance means connected in common to the emitter electrodes of said second transistor and said color killer transistor so that said second amplifier is rendered inoperative in response to maximum current conduction in said color killer transistor and is rendered operative to amplify said chrominance video signal component in response to minimum current conduction in said color killer transistor.

5. In a television receiver adapted to receive both color and black and white television signals, said color signal including a chrominance video signal component in the form of a phase and amplitude modulated subcarrier wave of a given frequency and color synchronizing bursts comprising several cycles of said subcarrier wave frequency and having a fixed amplitude, the combination comprising:

a first amplifier including a first transistor and adapted to amplify substantially only signals in the frequency range of said subcarrier wave and its modulation sidebands, said first transistor having base, emitter and collector electrodes;

means to impress said composite television signal on the base electrode of said first transistor;

a second amplifier including a second transistor and adapted to amplify substantially only signals in the range of said subcarrier wave and its modulation sidebands, said second transistor having base, emitter and collector electrodes;

means coupling the collector electrode of said first transistor to the base electrode of said second transistor;

means for deriving an amplified chrominance signal component from the collector electrode of said second transistor;

means to separate said synchronizing bursts from said composite television signal;

means coupled to said burst separating means to rectify said color synchronizing bursts so as to develop an unidirectional control signal;

means to impress said control signal on the base electrode of said first transistor to vary its gain inversely to the amplitude of said color synchronizing bursts;

a color killer circuit including a color killer transistor, said color killer transistor having base and emitter;

means to couple the emitter electrode of said first transistor to the base electrode of said color killer transistor so that the current in said first amplifier produced in the absence of said modulated subcarrier wave biases said color killer transistor for maximum current conduction and so that the current in said first amplifier produced in response to a modulated subcarrier wave biases said color killer transistor for minimum current conduction; and a substantially constant current source connected in common to the emitter electrodes of said second transistor and said color killer transistor so that said second amplifier is rendered inoperative in response to maximum current conductor in said color killer transistor and is rendered operative to amplify said chrominance video signal component in response to minimum current conduction in said color killer transistor.

6. In a television receiver adapted to receive both color and black and white television signals, said color signal including a chrominance video signal component in the form of a phase and amplitude modulated subcarrier wave of a given frequency and color synchronizing bursts comprising several cycles of said subcarrier wave frequency and having a fixed amplitude, the combination comprising:

a first transistor amplifier responsive to, and adapted to amplify, substantially only said chrominance component;

a second transistor amplifier coupled to said first transistor amplifier and adapted to amplify substantially only said chrominance component;

a color killer circuit including a color keller transistor;

means responsive to current flow in said first transistor amplifier to control the bias of said color killer transistor so that the magnitude of current conduction in said color killer circuit depends upon the presence or absence of said chrominance component at said first transistor amplifier; and means responsive to current flow in said color killer circuit to render said second transistor amplifier operative or inoperative respectively depending upon the presence or absence of said chrominance component at said first transistor amplifier.

7. In a television receiver adapted to receive both color and black and white television signals, said color signal including a chrominance video signal component in the form of a phase and amplitude modulated subcarrier wave of a given frequency and color synchronizing bursts comprising several cycles of said subcarrier wave frequency and having a fixed amplitude, the combination comprising:

a first transistor amplifier responsive to, and adapted to amplify, substantially only said chrominance component;

a second transistor amplifier coupled to said first transistor amplifier and adapted to amplify substantially only said chrominance component;

a color killer circuit including a color killer transistor;

means responsive to current flow in said first transistor amplifier to bias said color killer transistor so that the current in said first transistor amplifier produced in the absence of said chrominance component effects current conduction of a first magnitude in said color killer circuit and so that the current in said first transistor amplifier produced in response to said chrominance component effects current conduction of a second magnitude in said color killer circuit; and means responsive to current flow in said color killer circuit to bias said second transistor amplifier so that said second transistor amplifier is rendered inoperative in response to said first magnitude of current conduction in said color killer circuit and is rendered operative to amplify said chrominance component in response to said second magnitude of current conductive in said color killer circuit.

8. In a television receiver adapted to receive both color and black and white television signals, said color signal including a chrominance video signal component in the form of a phase and amplitude modulated subcarrier wave of a given frequency and color synchronizing bursts comprising several cycles of said subcarrier wave frequency and having a fixed amplitude, the combination comprising:

a first transistor amplifier responsive to, and adapted to amplify, substantially only said chrominance component;

a second transistor amplifier coupled to said first transistor amplifier and adapted to amplify substantially only said chrominance component;

a color killer circuit including a color killer transistor;

means responsive to current flow in said first transistor amplifier to bias said color killer transistor so that the current in said first transistor amplifier produced in the absence of said chrominance component biases said color killer transistor for substantial current conduction and so that the current in said first transistor amplifier produced in response to said chrominance component biases said color killer transistor for decreased current conduction; and means responsive to current flow in said color killer circuit to bias said second transistor amplifier so that said second transistor amplifier is rendered inoperative in response to said substantial current conduction in said color killer circuit and is rendered operative to amplify said chrominance component in response to said decreased current conduction in said color killer circuit.

9. In a television receiver adapted to receive both color and black and white television signals, said color signal including a chrominance video signal component in the form of a phase and amplitude modulated subcarrier wave of a given frequency and color synchronizing bursts comprising several cycles of said subcarrier wave frequency and having a fixed amplitude, the combination comprising:

a first transistor amplifier responsive to and adapted to amplify substantially only said chrominance component;

a second amplifier including a second transistor and coupled to said first transistor amplifier and adapted to amplify substantially only said chrominance component, said second transistor having an emitter electrode;

a color killer including a color killer transistor circuit, said color killer transistor having a base electrode;

means responsive to current flow in said first transistor amplifier to bias the base electrode of said color killer transistor so that the current in said first transistor amplifier produced in the absence of said chrominance component biases said color killer transistor for maximum current conduction and so that the current in said first transistor amplifier produced in response to said chrominance component biases said color killer transistor for minimum current conduction; and means responsive to current flow in said color killer circuit to bias the emitter electrode of said second transistor so that said second transistor is rendered inoperative in response to maximum current conduction in said color killer circuit and is rendered operative to amplify said chrominance component in response to minimum current conduction in said color killer circuit.

10. In a television receiver adapted to receive both color and black and white television signals, said color signal including a chrominance video signal component in the form of a phase and amplitude modulated subcarrier wave of a given frequency and color synchronizing bursts comprising several cycles of said subcarrier wave frequency and having a fixed amplitude, the combination comprising:

a first amplifier including a first transistor and adapted to amplify substantially only signals in the frequency range of said subcarrier wave and its modulation sidebands, said first transistor having base, emitter and collector electrodes;

means to impress said composite television signal on the base electrode of said first transistor;

a second amplifier including a second transistor and adapted to amplify substantially only signals in the range of said subcarrier wave and its modulation sidebands, said second transistor having base, emitter and collector electrodes;

means coupling the collector electrode of said first transistor to the base electrode of said second transistor;

means for deriving an amplified chrominance signal component from the collector electrode of said second transistor;

a color killer circuit including a color killer transistor, said color killer transistor having base and emitter electrodes;

means to couple the emitter electrode of said first transistor to the base electrode of said color killer transistor so that the current in said first amplifier produced in response to an absence of said modulated subcarrier wave biases said color killer transistor for maximum current conduction and so that the current in said first amplifier produced in response to a modulated subcarrier wave biases said color killer transistor for minimum current conduction; and a substantially constant current source connected in common to the emitter electrodes of said second transistor and said color killer transistor so that said second amplifier is rendered inoperative in response to maximum current conduction in said color killer transistor and is rendered operative to amplify said chrominance video signal component in response to minimum current conduction in said color killer transistor.

References Cited by the Examiner

UNITED STATES PATENTS

| | | | |
|---|---|---|---|
| 2,736,765 | 2/1956 | Lohman et al. | 178—5.4 |
| 2,871,305 | 1/1959 | Hurtig | 330—24 |
| 2,894,061 | 7/1959 | Oakley et al. | 178—5.4 |
| 3,014,186 | 12/1961 | Webster | 330—24 |
| 3,056,086 | 9/1962 | Brauner | 325—319 |
| 3,061,793 | 10/1962 | Verkruissen | 178—7.5 |
| 3,185,887 | 5/1965 | Kobbe | 315—26 |

OTHER REFERENCES

Transistor Manual, General Electric Company, 6th ed., copyright March 20, 1962.

DAVID G. REDINBAUGH, *Primary Examiner.*

ROBERT SEGAL, *Examiner.*

J. A. O'BRIEN, *Assistant Examiner.*

UNITED STATES PATENT OFFICE

CERTIFICATE OF CORRECTION

Patent No. 3,272,915 September 13, 1966

Gerald E. Theriault

It is hereby certified that error appears in the above numbered patent requiring correction and that the said Letters Patent should read as corrected below.

Column 2, line 1, after "another" insert -- object --; column 7, line 34, for "scond" read -- second --; line 38, for "in opera" read -- inopera --; column 10, line 5, after "emitter" insert -- electrodes --; line 19, for "conductor" read -- conduction --; line 38, for "keller" read -- killer --; column 11, line 8, for "ductive" read -- duction --; line 57, after "killer", first occurrence, insert -- circuit --; same line 57, after "transistor" strike out "circuit" --.

Signed and sealed this 22nd day of August 1967.

(SEAL)
Attest:

ERNEST W. SWIDER
Attesting Officer

EDWARD J. BRENNER
Commissioner of Patents